United States Patent
Wang (10) Patent No.: US 10,523,589 B2
(45) Date of Patent: Dec. 31, 2019

(54) TRAFFIC CONTROL METHOD, APPARATUS, AND SYSTEM

(71) Applicant: Huawei Technologies Co., Ltd., Shenzhen (CN)

(72) Inventor: Taohui Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/909,565

(22) Filed: Mar. 1, 2018

(65) Prior Publication Data

US 2018/0191636 A1  Jul. 5, 2018

Related U.S. Application Data

(63) Continuation of application No. PCT/CN2017/073451, filed on Feb. 14, 2017.

(30) Foreign Application Priority Data

Feb. 29, 2016  (CN) .......................... 2016 1 0112450

(51) Int. Cl.
*H04L 12/927* (2013.01)
*H04L 12/851* (2013.01)
*H04L 12/923* (2013.01)

(52) U.S. Cl.
CPC ........ *H04L 47/805* (2013.01); *H04L 47/2425* (2013.01); *H04L 47/762* (2013.01); *H04L 47/808* (2013.01)

(58) Field of Classification Search
CPC . H04L 47/805; H04L 47/2425; H04L 47/808; H04L 47/762; H04L 47/32; H04L 47/31; H04W 88/14; H04W 28/10
See application file for complete search history.

(56) References Cited

U.S. PATENT DOCUMENTS

| | | | |
|---|---|---|---|
| 2008/0037552 A1 | 2/2008 | Dos Remedios et al. | |
| 2009/0103448 A1 | 4/2009 | Waggener et al. | |
| 2011/0158101 A1* | 6/2011 | Figueira | H04L 47/20 370/235.1 |
| 2011/0280130 A1* | 11/2011 | Foottit | H04L 47/12 370/236 |

(Continued)

FOREIGN PATENT DOCUMENTS

| | | |
|---|---|---|
| CN | 102195819 A | 9/2011 |
| CN | 103441943 A | 12/2013 |

(Continued)

OTHER PUBLICATIONS

Machine Translation and Abstract of Chinese Publication No. CN102195819, dated Sep. 21, 2011, 18 pages.

(Continued)

*Primary Examiner* — Ivan O Latorre
(74) *Attorney, Agent, or Firm* — Conley Rose, P.C.

(57) ABSTRACT

A traffic control method, where a network device adds a traffic control tag to traffic that is over guaranteed bandwidth or to traffic of the guaranteed bandwidth, and sends, to a backbone network switching device, a data flow that carries the traffic control tag. The backbone network switching device discards, according to the traffic control tag, the traffic that is over the guaranteed bandwidth. Hence, traffic of guaranteed bandwidth of a user is ensured.

19 Claims, 3 Drawing Sheets

(56) References Cited

U.S. PATENT DOCUMENTS

| | | | |
|---|---|---|---|
| 2013/0003554 A1 | 1/2013 | Aybay et al. | |
| 2014/0064072 A1* | 3/2014 | Ludwig | H04L 47/2483 370/230 |
| 2014/0293796 A1* | 10/2014 | Jeong | H04M 15/66 370/236 |
| 2014/0321288 A1 | 10/2014 | Ha et al. | |
| 2016/0036706 A1* | 2/2016 | Hiscock | H04L 12/462 370/230 |
| 2016/0156538 A1* | 6/2016 | Yalagandula | G06F 9/45533 709/224 |
| 2016/0212668 A1* | 7/2016 | Castro Castro | H04L 47/20 |

FOREIGN PATENT DOCUMENTS

| | | |
|---|---|---|
| CN | 104254106 A | 12/2014 |
| CN | 104333882 A | 2/2015 |
| CN | 104601488 A | 5/2015 |
| CN | 105245466 A | 1/2016 |
| JP | 2003218923 A | 7/2003 |
| JP | 2005217823 A | 8/2005 |

OTHER PUBLICATIONS

Machine Translation and Abstract of Chinese Publication No. CN103441943, dated Dec. 11, 2013, 14 pages.
Machine Translation and Abstract of Chinese Publication No. CN104601488, dated May 6, 2015, 13 pages.
Foreign Communication From a Counterpart Application, PCT Application No. PCT/CN2017/073451, English Translation of International Search Report dated May 3, 2017, 2 pages.
Foreign Communication From a Counterpart Application, European Application No. 17759107.0, Extended European Search Report dated Jun. 28, 2018, 8 pages.
Foreign Communication From a Counterpart Application, Japanese Application No. 2017-564623, Japanese Office Action dated Sep. 14, 2018, 5 pages.
Foreign Communication From a Counterpart Application, Japanese Application No. 2017-564623, English Translation of Japanese Office Action dated Sep. 14, 2018, 5 pages.
Machine Translation and Abstract of Japanese Publication No. JP2003218923, dated Jul. 31, 2003, 35 pages.
Machine Translation and Abstract of Japanese Publication No. JP2005217823, dated Aug. 11, 2005, 19 pages.
Foreign Communication From a Counterpart Application, Korean Application No. 10-2017-7034371, Korean Office Action dated Jun. 12, 2019, 6 pages.
Foreign Communication From a Counterpart Application, Korean Application No. 10-2017-7034371, English Translation of Korean Office Action dated Jun. 24, 2019, 9 pages.
Machine Translation and Abstract of Chinese Publication No. CN104254106, dated Dec. 31, 2014, 46 pages.
Machine Translation and Abstract of Chinese Publication No. CN104333882, dated Feb. 4, 2015, 6 pages.
Machine Translation and Abstract of Chinese Publication No. CN105245466, dated Jan. 13, 2016, 12 pages.
Foreign Communication From a Counterpart Application, Chinese Application No. 201610112450.9, Chinese Office Action dated Nov. 6, 2019, 18 pages.

* cited by examiner

TRAFFIC CONTROL METHOD, APPARATUS, AND SYSTEM

CROSS-REFERENCE TO RELATED APPLICATIONS

This application is a continuation of International Patent Application No. PCT/CN2017/073451 filed on Feb. 14, 2017, which claims priority to Chinese Patent Application No. 201610112450.9 filed on Feb. 29, 2016. The disclosures of the aforementioned applications are hereby incorporated by reference in their entireties.

TECHNICAL FIELD

The present disclosure relates to the field of communications technologies, and in particular, to a traffic control method, an apparatus, and a system.

BACKGROUND

In an evolved packet system (EPS), a basic granularity for quality of service (QoS) control is an EPS bearer. All data flows on a same bearer obtain a same QoS guarantee, and different QoS guarantees need to be provided by different EPS bearers. EPS bearers may be classified into two types according to different QoS: a guaranteed bit rate (GBR) bearer and a non-GBR bearer.

The GBR bearer is mainly used to carry a service such as a voice, a video, or a real-time game using a dedicated bearer. A parameter GBR represents a bit rate that can be expectedly provided by the GBR bearer, and a parameter maximum bit rate (MBR) limits a bit rate that can be provided by the GBR bearer and represents an upper limit of an expected data rate provided by the GBR bearer. The MBR needs to be greater than or equal to the GBR. When resources are strained, traffic that is over the GBR is discarded, but traffic within the GBR needs to be ensured.

The non-GBR bearer is mainly used to carry various data services. The non-GBR bearer may be simply understood as a bearer that provides an Internet Protocol (IP) connection between best effort networks. The non-GBR bearer is set up with setup of a public data network (PDN) connection, and removed with removal of the PDN connection. When a network is congested, a non-GBR service (or bearer) needs to be subjected to a rate reduction requirement.

A backbone network is a network for forming a core connection of the Internet. The backbone network may be a transmit network to which user service data flows from user equipment (UE) through an operator network such as a core network (which may be an EPS network, a circuit switched (CS) network, or the like). A large quantity of data flows converge in the backbone network. Different from QoS control according to a data flow in the EPS network, in the backbone network, a large quantity of resource overheads need to be increased if QoS is controlled according to a granularity of a data flow. Therefore, in an existing network architecture, a backbone network is deployed based on redundancy, and it is considered that network resources are sufficient. The backbone network establishes pipes that meet different QoS and puts, for transmission, data flows with corresponding QoS requirements into the pipes (for example, a GBR pipe and a non-GBR pipe are established).

When the UE is connected to a network, an EPS bearer that meets a subscribed QoS requirement is set up according to user information and service information. When the UE performs a service, a data flow matches, in an EPS system according to IP quintuples of a data flow sender and a data flow receiver, a corresponding EPS bearer for transmission. Data flows flow from the EPS network to the backbone network and then converge in a same pipe for transmission, and are transmitted through the backbone network to a peer end or a corresponding service platform. By means of static configuration in the backbone network, the data flows match, based on IP quintuples of the data flows, an established pipe for transmission. In the foregoing manner, control meeting a QoS requirement in an entire service procedure from the EPS network to the backbone network is implemented.

In a fifth generation (5G) network, as a quantity of terminal users and service volumes increase, control of a software defined networking (SDN)-based architecture on a network poses a higher requirement on network resource utilization. After a large quantity of services converge in the backbone network, congestion may occur. However, in an existing transmission mode, the backbone network does not identify a specific data flow. Consequently, traffic of guaranteed bandwidth of a user cannot be ensured, for example, traffic within a GBR cannot be ensured. As a result, end-to-end QoS of a service cannot be ensured.

SUMMARY

Embodiments of the present disclosure provide a traffic control method, an apparatus, and a system in order to ensure traffic of guaranteed bandwidth of a user.

According to a first aspect, an embodiment of the present disclosure provides a traffic control method, including adding, by a network device, a traffic control tag to traffic that is over guaranteed bandwidth, or adding a traffic control tag to traffic of guaranteed bandwidth, sending, to a backbone network switching device, a data flow that carries the traffic control tag, and discarding, by the backbone network switching device according to the traffic control tag, the traffic that is over the guaranteed bandwidth.

According to the method, traffic of guaranteed bandwidth of a user can be guaranteed in order to avoid discarding some traffic of the guaranteed bandwidth and retaining some traffic that is over the guaranteed bandwidth. For example, it is avoided that some traffic within a GBR of a data flow is discarded, and some traffic that is over the GBR of the data flow is retained.

For example, when a backbone network is congested, the traffic of the guaranteed bandwidth of the user can be ensured. The network device may be a gateway or an eNodeB.

With reference to the first aspect, in a first possible implementation of the first aspect, before the network device adds the traffic control tag to the traffic that is over the guaranteed bandwidth, or adds the traffic control tag to the traffic of the guaranteed bandwidth, the network device detects traffic of guaranteed bandwidth and traffic that is over guaranteed bandwidth that are in the received data flow.

With reference to the first aspect or the first possible implementation of the first aspect, in a second possible implementation of the first aspect, adding a traffic control tag to traffic that is over guaranteed bandwidth includes classifying the traffic that is over the guaranteed bandwidth into at least two classes, and separately adding a corresponding traffic control tag. Correspondingly, discarding, by the backbone network switching device according to the traffic control tag, the traffic that is over the guaranteed bandwidth includes discarding by class, by the backbone network switching device according to the traffic control tag and a congestion degree, the traffic that is over the guaranteed bandwidth. In this way, the data flow can be controlled in a refined manner, and a network resource can be used more effectively.

With reference to any one of the first aspect, or the first to the second possible implementations of the first aspect, in a third possible implementation of the first aspect, the backbone network switching device reports, to a policy center, an event of discarding the traffic that is over the guaranteed bandwidth and the congestion degree such that the policy center determines, according to the event, a user whose bandwidth needs to be reduced, where the event carries an identifier of a data flow of the discarded traffic that is over the guaranteed bandwidth. In this way, the policy center can learn of a status of the backbone network in a timely manner, and dynamically determine the user whose bandwidth needs to be reduced.

With reference to the third possible implementation of the first aspect, in a fourth possible implementation of the first aspect, the network device receives an adjustment policy that is of reducing the bandwidth of the user and that is from the policy center, and the network device sends the adjustment policy to the user such that the bandwidth is reduced when the user sends a data flow. In this way, the network device can learn of a bandwidth policy of the user in a timely manner and feedback the policy to the user in a timely manner such that the user can dynamically adjust, according to a congestion status of the backbone network, the bandwidth for sending the data flow.

With reference to the fourth possible implementation of the first aspect, in a fifth possible implementation of the first aspect, the adjustment policy includes bandwidth used for a service of the user does not exceed allowed bandwidth of the backbone network.

With reference to any one of the first aspect, or the first to the fifth possible implementations of the first aspect, in a sixth possible implementation of the first aspect, the backbone network switching device further discards the traffic of the guaranteed bandwidth.

With reference to the sixth possible implementation of the first aspect, in a seventh possible implementation of the first aspect, after discarding the traffic of the guaranteed bandwidth, the backbone network switching device further reports an event of discarding traffic of guaranteed bandwidth of the user to the policy center such that the policy center determines, according to the event, that the adjustment policy of the user is to remove a bearer corresponding to the guaranteed bandwidth of the user, where the event carries an identifier of a discarded data flow. In this way, the policy center can reversely adjust a resource of the user according to a status of traffic processing performed by the backbone network such that a network resource can be used more properly.

With reference to the seventh possible implementation of the first aspect, in an eighth possible implementation of the first aspect, the network device receives the policy that is of removing the bearer corresponding to the guaranteed bandwidth of the user and that is from the policy center, and the network device removes the bearer corresponding to the guaranteed bandwidth of the user.

With reference to any one of the first aspect, or the first to the eighth possible implementations of the first aspect, in a ninth possible implementation of the first aspect, before the step of detecting, the method further includes receiving, by the network device, a message delivered from the policy center, where the message is used to instruct the network device to detect the traffic of the guaranteed bandwidth and the traffic that is over the guaranteed bandwidth that are in the received data flow. In this way, the policy center can control whether the network device detects the traffic of the guaranteed bandwidth.

With reference to the ninth possible implementation of the first aspect, in a tenth possible implementation of the first aspect, when congestion occurs in the backbone network, the backbone network switching device reports a congestion status to the policy center. In this way, the policy center can instruct, only when a network is congested, the network device to detect the traffic of the guaranteed bandwidth in order to perform traffic control. Therefore, a function of the network device is optimized.

According to a second aspect, an embodiment of the present disclosure provides another traffic control method, including adding, by a network device, a traffic control tag to traffic that is over guaranteed bandwidth, or adding a traffic control tag to traffic of guaranteed bandwidth, and sending, to a backbone network switching device, a data flow that carries the traffic control tag such that the backbone network switching device discards, according to the traffic control tag, the traffic that is over the guaranteed bandwidth.

According to a third aspect, an embodiment of the present disclosure provides another traffic control method, including receiving, by a backbone network switching device, a data flow that is sent by a network device and that carries a traffic control tag, where the traffic control tag includes a traffic control tag carried in traffic that is over guaranteed bandwidth or a traffic control tag carried in traffic of guaranteed bandwidth, and discarding, by the backbone network switching device according to the traffic control tag, the traffic that is over the guaranteed bandwidth.

According to a fourth aspect, an embodiment of the present disclosure provides a network device for implementing traffic control. The network device has functions of implementing behavior of the network device in the foregoing methods. The functions may be implemented using hardware, or implemented by executing corresponding software by hardware. The hardware or the software includes one or more modules corresponding to the foregoing functions.

According to a fifth aspect, an embodiment of the present disclosure provides a backbone network switching device for implementing traffic control. The backbone network switching device has functions of implementing behavior of the backbone network switching device in the foregoing methods. The functions may be implemented using hardware, or implemented by executing corresponding software by hardware. The hardware or the software includes one or more modules corresponding to the foregoing functions.

According to a sixth aspect, an embodiment of the present disclosure provides a network device. A structure of the network device includes a processor and a memory. The memory is configured to store application program code that allows the network device to perform the foregoing methods. The processor is configured to execute an application program stored in the memory. The network device may further include a communications interface, configured for communication between the network device and another device or a communications network.

According to a seventh aspect, an embodiment of the present disclosure provides a backbone network switching device. A structure of the backbone network switching device includes a processor and a memory. The memory is configured to store application program code that allows the backbone network switching device to perform the foregoing methods. The processor is configured to execute an application program stored in the memory. The backbone network switching device may further include a communications interface, configured for communication between the backbone network switching device and another device or a communications network.

According to an eighth aspect, an embodiment of the present disclosure provides a computer storage medium configured to store a computer software instruction used by the network device. The computer storage medium includes a program designed for the network device to perform the foregoing aspects.

According to a ninth aspect, an embodiment of the present disclosure provides a computer storage medium configured to store a computer software instruction used by the backbone network switching device. The computer storage medium includes a program designed for the backbone network switching device to perform the foregoing aspects.

According to a tenth aspect, an embodiment of the present disclosure provides a system for implementing traffic control, including the network device and the backbone network switching device. The system may further include the policy center.

In the present disclosure, a name of the network device and a name of the backbone network switching device do not constitute limitations on devices. In actual implementation, these devices may appear in other names. Provided that functions of devices are similar to those in the present disclosure, the devices fall within the scope of the claims of the present disclosure and their equivalent technologies.

In comparison with other approaches, in the solutions provided in the embodiments of the present disclosure, traffic of guaranteed bandwidth of a user can be ensured.

These and other aspects of the present disclosure are more concise and comprehensible with description in the following embodiments.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the present disclosure in detail with reference to the accompanying drawings. In addition, a specific operating method in a method embodiment may also be applied to an apparatus embodiment or a system embodiment.

The objective of network architectures and service scenarios described in the embodiments of the present disclosure is to describe the technical solutions of the embodiments of the present disclosure more clearly, and does not constitute limitations on the technical solutions provided in the embodiments of the present disclosure. A person of ordinary skill in the art may know that with evolution of network architectures and emergence of new service scenarios, the technical solutions provided in the embodiments of the present disclosure are also applicable to similar technical problems.

Figure 1:
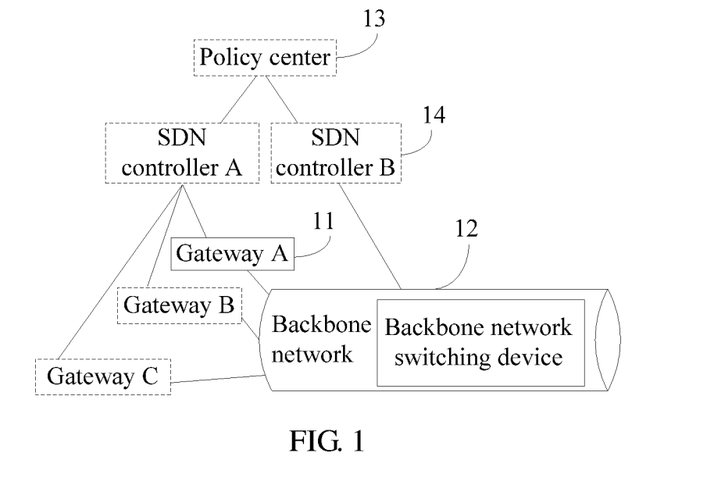
FIG. 1 is a schematic diagram of a possible system according to an embodiment of the present disclosure.

As shown in FIG. 1, FIG. 1 is a schematic diagram of a possible system according to an embodiment of the present disclosure. The system includes a network device 11, and there may be one or more network devices 11 in the system. The network devices 11 may be gateways of different operator networks (for example, an EPS network and a CS network), and are configured to implement interworking between the operator networks and a backbone network. The network device 11 may alternatively be an evolved NodeB (eNodeB). Certainly, this is not limited to such two devices.

The system further includes a backbone network and a backbone network switching device 12. Data flows sent by different user terminals (i.e., UE) pass through different network devices 11 and converge in the backbone network, and are transmitted in the backbone network, and transmitted through the backbone network to a peer end or a corresponding service platform.

The UE in this application may include various handheld devices, vehicular devices, wearable devices, and computing devices that have a wireless communication function, or another processing device connected to a wireless modem, and various forms of UE, mobile stations (MS), terminals, terminal device, software clients, and the like. For ease of description, in this application, devices mentioned above are collectively referred to as UE.

The system may further include a policy center 13. The policy center 13 may control transmission of a data flow in an operator network (for example, an EPS network or a CS network), and may further implement control on transmission of the backbone network in order to implement uniform control of end-to-end (for example, from a data flow sender to a data flow receiver) QoS. The policy center 13 may perform control directly or using an SDN controller 14. There may be one (an SDN controller A) or more (an SDN controller A and an SDN controller B) SDN controllers 14 in the system. For example, the policy center 13 controls the network device 11 using the SDN controller A, and controls the backbone network switching device 12 using the SDN controller B 14. Certainly, SDN controllers 14 used to control different network devices 11 may be different SDN controllers 14, and SDN controllers 14 used to control different network devices 11 and the backbone network switching device 12 may be a same SDN controller 14. FIG. 1 is merely an example.

As shown in FIG. 1, for example, traffic of guaranteed bandwidth of a bearer corresponding to UE 1 (not shown) is 4 megabits per second (Mbps), and traffic that is over the guaranteed bandwidth is 4 Mbps to 6 Mbps. Traffic of guaranteed bandwidth of a bearer corresponding to UE 2 (not shown) is 2 Mbps, and traffic that is over the guaranteed bandwidth is 2 Mbps to 3 Mbps. Traffic of guaranteed bandwidth of a bearer corresponding to UE 3 (not shown) is 8 Mbps, and traffic that is over the guaranteed bandwidth is 8 Mbps to 10 Mbps. Data flows of the UE 1, the UE 2, and the UE 3 respectively pass through a gateway A, a gateway B, and a gateway C, and converge in the backbone network. When the EPS network has sufficient resources, and when transmitting, to the backbone network, a data flow that meets the traffic of the guaranteed bandwidth, the EPS also transmits the traffic that is over the guaranteed bandwidth. However, congestion occurs after a large quantity of data flows from multiple gateways converge in the backbone network. Because the backbone network does not identify a specific data flow, the backbone network cannot distinguish the traffic of the guaranteed bandwidth from the traffic that is over the guaranteed bandwidth. After the backbone network performs traffic control (traffic control for short), the traffic that is over the guaranteed bandwidth of the UE 2 may be transmitted, and the traffic of the guaranteed bandwidth of the UE 3 may be discarded. As a result, end-to-end QoS of the data flow of the UE 3 cannot be ensured.

In specific implementation, the traffic of the guaranteed bandwidth may be traffic within a GBR, and the traffic that is over the guaranteed bandwidth may be traffic between the GBR and an MBR. Certainly, the traffic of the guaranteed bandwidth and the traffic that is over the guaranteed bandwidth may not be represented as the traffic within the GBR and the traffic between the GBR and the MBR, and may be represented in another manner. This is not limited herein.

An example in which the traffic of the guaranteed bandwidth is the traffic within the GBR and the traffic that is over the guaranteed bandwidth is the traffic between the GBR and the MBR is used for description in the following. For example, a GBR and an MBR of the bearer corresponding to the UE 1 are respectively 4 Mbps and 6 Mbps, a GBR and an MBR of the bearer corresponding to the UE 2 are respectively 2 Mbps and 3 Mbps, and a GBR and an MBR of the bearer corresponding to the UE 3 are respectively 8 Mbps and 10 Mbps. The data flows of the UE 1, the UE 2, and the UE 3 respectively pass through the gateway A, the gateway B, and the gateway C, and converge in the backbone network. When the EPS network has sufficient resources, and when transmitting, to the backbone network, a data flow that meets the traffic within the GBR, the EPS network also transmits the traffic between the GBR and the MBR. However, congestion occurs after a large quantity of data flows from multiple gateways converge in the backbone network. Because the backbone network does not identify a specific data flow, the backbone network cannot distinguish the GBR from the MBR. After the backbone network performs traffic control, the traffic of the UE 2 between the GBR and the MBR may be transmitted, and the traffic of the UE 3 within the GBR may be discarded. As a result, end-to-end QoS of the data flow of the UE 3 cannot be ensured.

Further, because the EPS network cannot learn of congestion status of the backbone network, the EPS network cannot alleviate the congestion status of the backbone network by adjusting bandwidth at a source end (for example, a data flow sender, which may be UE or another sender) of a data flow, and impact of a data flow loss on service quality cannot be avoided.

According to the method, the apparatus, and the system provided in the embodiments of the present disclosure, traffic, in a data flow, of guaranteed bandwidth (for example, traffic within a GBR) can be ensured. Further, the backbone network switching device 12 may further report a congestion degree of the backbone network switching device 12 and report an event of discarding traffic that is over the guaranteed bandwidth and a congestion degree to the policy center such that the policy center determines, according to the event, a user whose bandwidth needs to be reduced, and delivers an adjustment policy of reducing the bandwidth of the user to the network device. The event carries an identifier of a data flow of the discarded traffic that is over the guaranteed bandwidth. The adjustment policy is sent to the user using the network device such that the bandwidth is reduced when the user sends a data flow. Therefore, the bandwidth is adjusted at a source end of the data flow to alleviate congestion of the backbone network.

Figure 2:
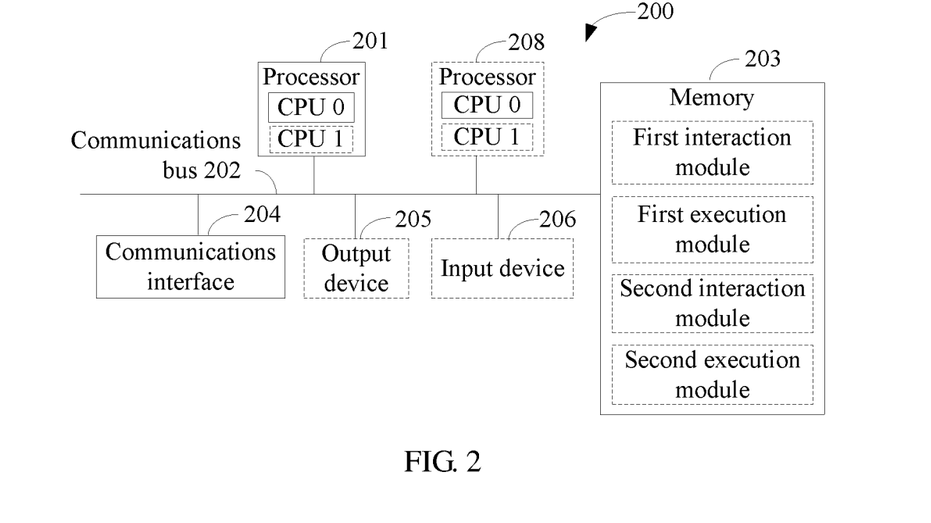
FIG. 2 is a schematic diagram of a computer device according to an embodiment of the present disclosure.

As shown in FIG. 2, the network device 11 (for example, a gateway or an eNodeB) and the backbone network switching device 12 in FIG. 1 may be implemented in a form of a computer device (or a system) in FIG. 2.

FIG. 2 is a schematic diagram of a computer device 200 according to an embodiment of the present disclosure. The computer device 200 includes at least one processor 201, a communications bus 202, a memory 203, and at least one communications interface 204.

The processor 201 may be a general-purpose central processing unit (CPU), a microprocessor, an application-specific integrated circuit (ASIC), or one or more integrated circuits configured to control execution of a program of the solution in the present disclosure.

The communications bus 202 may include a path for transferring information between the foregoing components. The communications interface 204 uses an apparatus of any transceiver type to communicate with another device or a communications network such as an Ethernet, a radio access network (RAN), or a wireless local area network (WLAN).

The memory 203 may be a read-only memory (ROM) or another type of static storage device that can store static information and an instruction, or a random access memory (RAM) or another type of dynamic storage device that can store information and an instruction, or may be an electrically erasable programmable ROM (EEPROM), a compact disc ROM (CD-ROM) or other compact disc storage, optical disc storage (including a compact disc (CD), a laser disc, an optical disc, a digital versatile disc (DVD), a BLU-RAY DISC, or the like), a magnetic disk storage medium or another magnetic storage device, or any other medium that can be used to carry or store expected program code in a structural form of an instruction or data and that can be accessed by a computer, but this is not limited thereto. The memory 203 may exist independently, and is connected to the processor 201 using the communications bus 202. The memory 203 may be integrated with the processor 201.

The memory 203 is configured to store application program code for execution of the solution of the present disclosure, and the processor 201 controls the execution. The processor 201 is configured to execute the application program code stored in the memory 203.

In specific implementation, in an embodiment, the processor 201 may include one or more CPUs, for example, a CPU 0 and a CPU 1 in FIG. 2.

In specific implementation, in an embodiment, the computer device 200 may include multiple processors, for example, the processor 201 and a processor 208 in FIG. 2. Each of the processors 201 and 208 may be a single-core processor (single-CPU) or a multi-core processor (multi-CPU such as CPU 0 and CPU 1). The processors 201 and 208 herein may be one or more devices, circuits, and/or processing cores for processing data (for example, a computer program instruction).

In specific implementation, in an embodiment, the computer device 200 may further include an output device 205 and an input device 206. The output device 205 communicates with the processor 201, and may display information in multiple manners. For example, the output device 205 may be a liquid crystal display (LCD), a light emitting diode (LED) display device, a cathode ray tube (CRT) display device, a projector, or the like. The input device 206 communicates with the processor 201, and may receive a user input in multiple manners. For example, the input device 206 may be a mouse, a keyboard, a touch screen device, a sensing device, or the like.

The computer device 200 may be a general-purpose computer device or a dedicated computer device. In specific implementation, the computer device 200 may be a desktop computer, a portable computer, a network server, a personal digital assistant (PDA), a mobile phone, a tablet, a wireless terminal device, a communications device, an embedded device, or a device that has a structure similar to that in FIG. 2. This embodiment of the present disclosure does not limit a type of the computer device 200.

The network device 11 in FIG. 1 may be the computer device 200 shown in FIG. 2, and a memory of the network device 11 stores one or more software modules (for example, a first interaction module and a first execution module). The backbone network switching device 12 in FIG. 1 may be the computer device 200 shown in FIG. 2, and a memory of the backbone network switching device 12 stores one or more software modules (for example, a second interaction module and a second execution module). The network device 11 or the backbone network switching device 12 may implement the software modules using the processor 201 and program code that is stored in the memory 203 to implement traffic control.

An example in which the network device 11 is a gateway, is used for description in the following embodiments.

Figure 3:
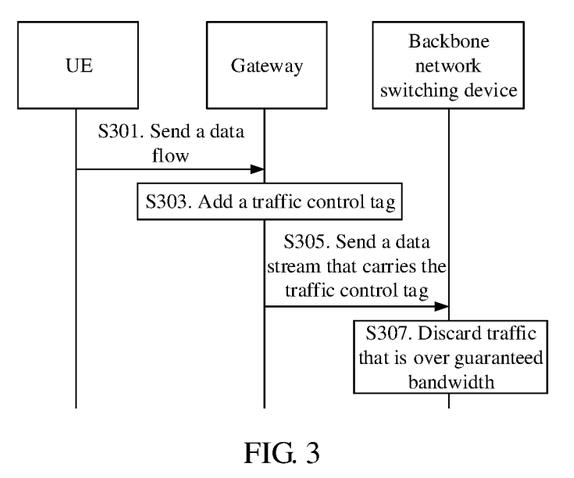
FIG. 3 is a schematic flowchart of a traffic control method according to an embodiment of the present disclosure.

As shown in FIG. 3, FIG. 3 is a schematic flowchart of a traffic control method according to an embodiment of the present disclosure.

Step S301: A UE sends a data flow to a gateway, and the gateway receives the data flow.

The data flow is transmitted through an EPS bearer to the gateway. For example, a GBR of an EPS bearer corresponding to the UE is 4 Mbps, an MBR of the EPS bearer is 6 Mbps, and bandwidth actually used is 6 Mbps.

Step S303: The gateway adds a traffic control tag to traffic that is over guaranteed bandwidth, or adds a traffic control tag to traffic of guaranteed bandwidth.

In specific implementation, there are multiple manners of adding the traffic control tag. For example, a field, that is, a tag type, may be added in metadata of the data flow. The tag type may be GBRin or GBRout. Certainly, other means may be used. This is not limited herein.

In this embodiment, an example in which the traffic of the guaranteed bandwidth is traffic within the GBR and the traffic that is over the guaranteed bandwidth is traffic between the GBR and the MBR is used for description.

In specific implementation, there may be the following several manners of adding the traffic control tag to the data flow.

In a first manner, the traffic control tag may be added to traffic of the UE that is over 4 Mbps, and the traffic control tag is not added to traffic within 4 Mbps. In a second manner, the traffic control tag is added to traffic within 4 Mbps, and the traffic control tag is not added to traffic that is over 4 Mbps. In a third manner, different traffic control tags are added to traffic within 4 Mbps and traffic that is over 4 Mbps.

In specific implementation, a traffic control tag that is added by the gateway to the data flow and a meaning of the tag may be preconfigured on the gateway, or may be delivered by another network element (for example, a policy center). Alternatively, a meaning of the tag may be preconfigured on a backbone network switching device, or may be delivered by another network element (for example, a policy center).

In this embodiment, the first manner is used as an example for description.

In specific implementation, before the gateway adds the traffic control tag to the traffic that is over the guaranteed bandwidth or adds the traffic control tag to the traffic of the guaranteed bandwidth, the gateway may further detect traffic of guaranteed bandwidth and traffic that is over guaranteed bandwidth that are in the received data flow.

Step S305: The gateway sends, to a backbone network switching device, a data flow that carries the traffic control tag. The backbone network switching device receives the data flow that is sent by the gateway and that carries the traffic control tag.

Further, in this embodiment, in the example in which the GBR of the UE is 4 Mbps, the gateway sends, to the backbone network switching device, the traffic that is within 4 Mbps and that does not carry a traffic control tag and the traffic (that is, traffic between 4 Mbps and 6 Mbps) that is over 4 Mbps and that carries a traffic control tag.

Step S307: The backbone network switching device discards, according to the traffic control tag, the traffic that is over the guaranteed bandwidth.

The backbone network switching device determines, according to the traffic control tag carried in the data flow of the UE, the traffic that is over the guaranteed bandwidth, discards the traffic that is over the guaranteed bandwidth, and retains the traffic of the guaranteed bandwidth. Further, in the first manner of adding the traffic control tag, the backbone network switching device discards the traffic that is of the UE and that carries the traffic control tag, that is, the traffic that is over the GBR and is between 4 Mbps and 6 Mbps, and retains the traffic, of the UE, that is within the GBR and that does not carry the traffic control tag, that is, the traffic within 4 Mbps.

In specific implementation, after the data flow of the UE is transmitted to a backbone network, the backbone network switching device determines, according to a specified congestion threshold (which may be preconfigured in the backbone network or may be delivered from the policy center), that congestion occurs in the backbone network. Therefore, traffic control needs to be performed on a data flow flowing through the backbone network. The traffic control herein includes discarding the traffic that is over the guaranteed bandwidth, and may further include discarding the traffic of the guaranteed bandwidth. The congestion threshold herein may be a pipe usage threshold.

In specific implementation, in an embodiment, the backbone network switching device may preconfigure a traffic control processing policy, or another device may deliver a traffic control processing policy to the backbone network switching device. The traffic control processing policy may be as follows. When congestion occurs in the backbone network, the backbone network switching device discards the traffic that is over the guaranteed bandwidth.

The actions of the gateway may be executed by the gateway according to the software modules in the memory mentioned above. For example, the actions of the gateway in steps S301 and S305 may be executed according to the first interaction module in FIG. 2. The action of the gateway in step S303 may be executed according to the first execution module in FIG. 2.

The actions of the backbone network switching device may be executed by the backbone network switching device according to the software modules in the memory mentioned above. For example, the action of the backbone network switching device in step S305 may be executed according to the second interaction module in FIG. 2. The action of the backbone network switching device in step S307 may be executed according to the second execution module in FIG. 2.

According to the foregoing method, the traffic within the GBR of the data flow can be ensured, for example, ensured when congestion occurs in the backbone network. Therefore, it is avoided that some traffic within the GBR of the data flow is discarded and some traffic that is over the GBR of the data flow is retained.

In specific implementation, in an embodiment, in the foregoing method, step S303 in which the gateway adds the traffic control tag to the traffic that is over the guaranteed bandwidth may include classifying the traffic that is over the guaranteed bandwidth into two or more classes, and adding a corresponding traffic control tag for each class.

In specific implementation, the gateway and the backbone network switching device may preconfigure a class corresponding to a traffic control tag, or another network element may deliver, to the gateway and the backbone network switching device, a class corresponding to a traffic control tag. Alternatively, the gateway may add a traffic control tag, and then negotiate with the backbone network switching device. A specific method is not limited herein.

Correspondingly, the backbone network switching device discards by class, according to a backbone network congestion degree and the traffic control tag, the traffic that is over the guaranteed bandwidth, that is, performs traffic control by class is implemented.

An example in which the GBR of the EPS bearer corresponding to the UE is 4 Mbps, the MBR of the EPS bearer is 6 Mbps, and the traffic that is over the GBR is classified into two classes is used in the following for describing the discarding, by class, the traffic that is over the guaranteed bandwidth. Further, the gateway may classify traffic between 4 Mbps and 6 Mbps, for example, classify traffic between 4 Mbps and 5 Mbps into a first class and adds a traffic control tag A, and classify traffic between 5 Mbps and 6 Mbps into a second class and adds a traffic control tag B. For a traffic control tag, in specific implementation, a tag type field and a tag index field may be added to the metadata of the data flow. A tag type may be GBRout, and a tag index may be a data identifier, for example A or B. A represents the traffic between 4 Mbps and 5 Mbps, and B represents the traffic between 5 Mbps and 6 Mbps. Certainly, another manner may be used. This is not limited herein.

After the data flow is transmitted to the backbone network, the backbone network switching device controls traffic according to a specified correspondence between a traffic control tag and a pipe usage threshold that reflects the backbone network congestion degree. For example, when pipe usage is 60%, traffic with a traffic control tag B is discarded, when pipe usage is 80%, traffic with a traffic control tag A is discarded, and so on. 60% or 80% herein is merely an example, and a specific value may be set according to a requirement.

Further, when the pipe usage is still not less than a specified maximum threshold, if all traffic between the GBR and the MBR that carries the traffic control tag is discarded, a pipe expansion procedure may be started, to increase bandwidth resources corresponding to a pipe. When the expansion fails or before the expansion is successful, traffic within the GBR that does not carry the traffic control tag, may be discarded. Certainly, when the pipe usage is still not less than a specified maximum threshold if all traffic that carries the traffic control tag is discarded, the traffic that does not carry the traffic control tag may be further discarded.

In specific implementation, in another embodiment, before step S303, the gateway may further receive a message delivered from the policy center. The message is used to instruct the gateway to detect the traffic of the guaranteed bandwidth and the traffic that is over the guaranteed bandwidth that are in the data flow and to add a tag. Then, the gateway executes step S303. Optionally, the policy center delivers the message to the gateway because the policy center receives an event that the backbone network switching device reports a congestion status. In this way, the policy center can instruct, only when a network is congested, the gateway to detect the traffic of the guaranteed bandwidth in order to perform traffic control. Therefore, burden of the gateway is reduced, and functions of the gateway and an entire system are optimized. In this embodiment, the actions of the gateway may be executed according to the first interaction module in FIG. 2.

Figure 4:
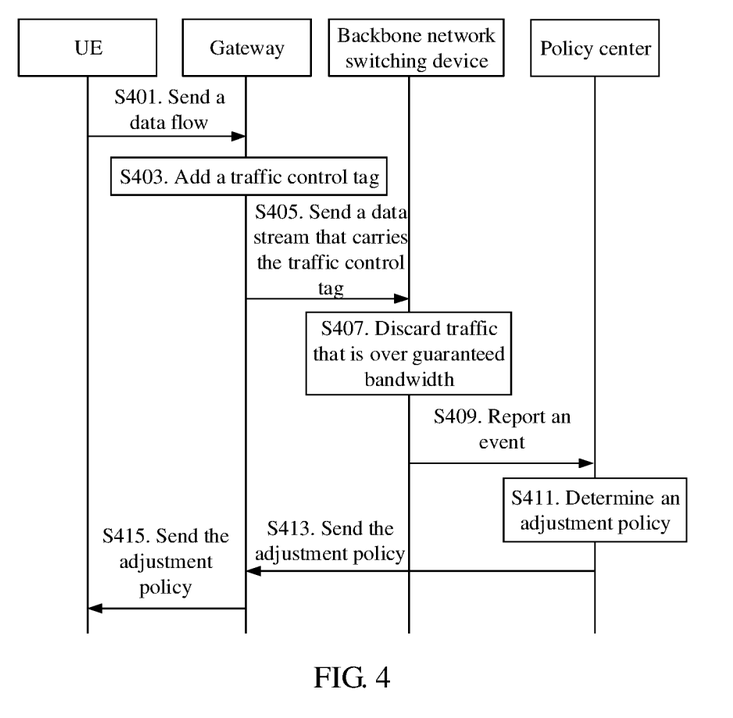
FIG. 4 is a schematic flowchart of a traffic control method according to an embodiment of the present disclosure.

As shown in FIG. 4, FIG. 4 is a schematic flowchart of another traffic control method according to an embodiment of the present disclosure.

Steps S401 to S407 are the same as steps S301 to S307, and are not described in detail herein again. In this embodiment, a traffic control manner in which the backbone network switching device discards traffic that is over guaranteed bandwidth is used as an example.

In specific implementation, before step S401, a policy center may deliver a traffic control processing policy to the backbone network switching device. The traffic control processing policy includes a backbone network congestion degree and a corresponding processing manner. For example, the backbone network congestion degree may be represented by pipe usage of a backbone network, and the corresponding processing manner may be represented by discarding traffic of a user that is over guaranteed bandwidth or by discarding a proportion of traffic of a user that is over guaranteed bandwidth. Certainly, this is not limited to these manners.

Step S409: The backbone network switching device reports, to a policy center, an event of discarding traffic that is over guaranteed bandwidth and a backbone network congestion degree. The policy center receives the event of discarding the traffic that is over the guaranteed bandwidth and the backbone network congestion degree, where the event and the backbone network congestion degree are reported by the backbone network switching device. The event includes an identifier of a discarded data flow that is over the guaranteed bandwidth.

In specific implementation, in an implementation, if the policy center controls the backbone network switching device using an SDN controller, the backbone network switching device needs to report, using the SDN controller to the policy center, the event of discarding the traffic that is over the guaranteed bandwidth and the backbone network congestion degree.

In specific implementation, in an implementation, the event of discarding the traffic that is over the guaranteed bandwidth and the backbone network congestion degree are reported to the policy center without using an SDN controller.

Step S411: The policy center determines an adjustment policy according to the event of discarding the traffic that is over the guaranteed bandwidth.

In specific implementation, the policy center may determine, according to the identifier included in the event of the discarded data flow that is over the guaranteed bandwidth, a corresponding adjustment policy of a user, that is, a policy of reducing bandwidth of the user (for example, reducing an MBR).

In this way, the policy center may dynamically determine a user whose bandwidth needs to be reduced in order to adjust bandwidth of the user.

Step S413: The policy center sends the adjustment policy of reducing bandwidth of a user to the gateway. The gateway receives the adjustment policy, sent by the policy center, of reducing the bandwidth of the user.

The adjustment policy is that bandwidth used for a service of the user does not exceed allowed bandwidth of the backbone network.

Step S415: The gateway sends the adjustment policy to the UE such that the bandwidth is reduced when the user sends a data flow.

In this way, the gateway can learn of a bandwidth policy of the user in a timely manner and feedback the policy to the user in a timely manner such that UE can dynamically adjust, according to a congestion status of the backbone network, the bandwidth for sending the data flow.

The actions of the backbone network switching device may be executed by the backbone network switching device according to the software modules in the memory mentioned above. For example, the action of the backbone network switching device in step S409 may be executed according to the second interaction module in FIG. 2.

The actions of the gateway may be executed by the gateway according to the software modules in the memory mentioned above. For example, the actions of the gateway in steps S413 and S415 may be executed according to the first interaction module in FIG. 2.

Figure 5:
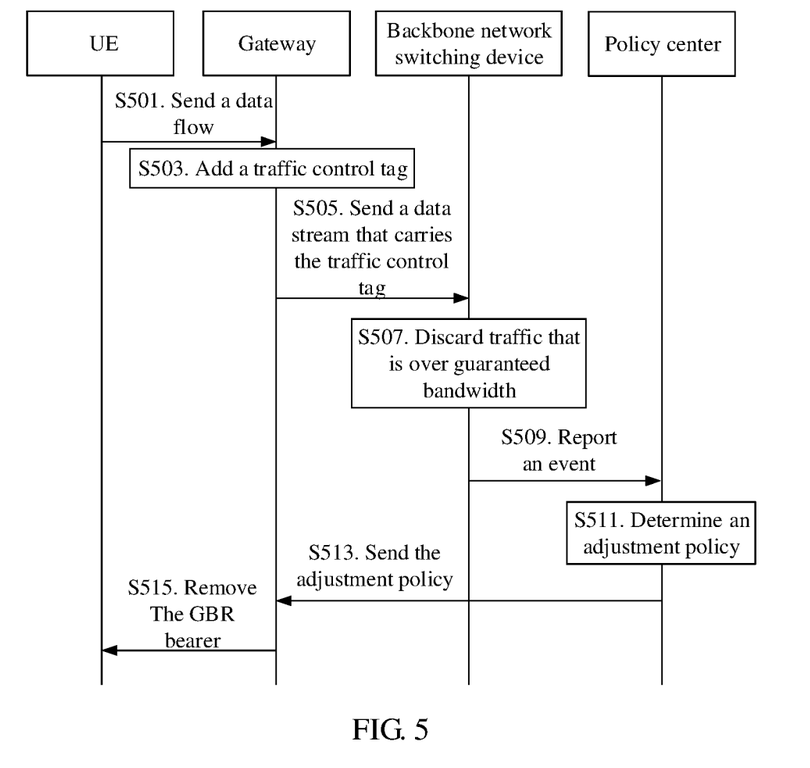
FIG. 5 is a schematic flowchart of a traffic control method according to an embodiment of the present disclosure.

As shown in FIG. 5, FIG. 5 is a schematic flowchart of another traffic control method according to an embodiment of the present disclosure.

Steps S501 to S507 are the same as steps S301 to S307, and are not described in detail herein again.

In this embodiment, a traffic control manner in which the backbone network switching device discards traffic of guaranteed bandwidth is used as an example.

Step S509: The backbone network switching device reports an event of discarding traffic of guaranteed bandwidth of a user to a policy center. The policy center receives the event, reported by the backbone network switching device, of discarding the traffic of the guaranteed bandwidth of the user. The event carries an identifier of a discarded data flow.

In specific implementation, in an implementation, if the policy center controls the backbone network switching device using an SDN controller, the backbone network switching device needs to report, using the SDN controller to the policy center, the event of discarding the traffic of the guaranteed bandwidth and a backbone network congestion degree.

In specific implementation, in an implementation, the backbone network switching device reports the event of discarding the traffic of the guaranteed bandwidth and the backbone network congestion degree to the policy center without an SDN controller.

Step S511: The policy center determines, according to the event of discarding the traffic of the guaranteed bandwidth of the user, an adjustment policy of the user that is to remove a bearer corresponding to the guaranteed bandwidth of the user (for example, the bearer corresponding to the guaranteed bandwidth herein is a GBR bearer).

In specific implementation, the policy center may determine a corresponding adjustment policy of the user according to the identifier, included in the event, of the data flow.

Step S513: The policy center sends the adjustment policy to a gateway, and the gateway receives the adjustment policy sent by the policy center.

Step S515: The gateway removes the GBR bearer of the UE.

In specific implementation, the gateway may remove (or delete) the GBR bearer of the user by receiving, by the gateway, a bearer removal instruction delivered from the policy center, and initiating deletion of a bearer request corresponding to the GBR bearer. The bearer request may be sent through a serving gateway (SGW) to a mobility management entity (MME), and then sent to an eNodeB and UE that is used by the user.

In specific implementation, the method of discarding the traffic of the guaranteed bandwidth by the backbone network switching device and steps S509 to S515 may be executed in combination with the traffic control method in FIG. 4. That is, after the method of discarding the traffic that is over the guaranteed bandwidth shown in FIG. 4, the traffic of the guaranteed bandwidth may be further discarded. For example, if the backbone network is still congested after the traffic that is over the guaranteed bandwidth is discarded, the traffic of the guaranteed bandwidth can be further discarded.

The actions of the backbone network switching device may be executed by the backbone network switching device according to the software modules in the memory mentioned above. For example, the action of the backbone network switching device in step S509 may be executed according to the second interaction module in FIG. 2.

The actions of the gateway may be executed by the gateway according to the software modules in the memory mentioned above. For example, the actions of the gateway in steps S513 and S515 may be executed according to the first interaction module in FIG. 2.

Figure 6:
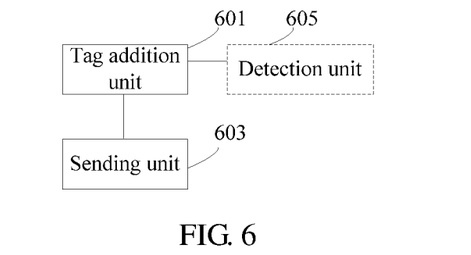
FIG. 6 is a schematic structural diagram of a network device according to an embodiment of the present disclosure.

As shown in FIG. 6, an embodiment of the present disclosure further provides a schematic structural diagram of a network device. A network device includes a tag addition unit 601 and a sending unit 603. The tag addition unit 601 is configured to add a traffic control tag to traffic that is over guaranteed bandwidth, or add a traffic control tag to traffic of guaranteed bandwidth. The sending unit 603 is configured to send, to a backbone network switching device, a data flow that carries the traffic control tag such that the backbone network switching device discards, according to the traffic control tag, the traffic that is over the guaranteed bandwidth. The network device may further include a detection unit 605 configured to detect traffic of guaranteed bandwidth and traffic that is over guaranteed bandwidth that are in the received data flow.

In this embodiment, the network device is represented in a form of a functional unit. The "unit" herein may be an ASIC, a circuit, a processor and a memory that execute one or more software or firmware programs, an integrated logic circuit, and/or another device that can provide the foregoing functions. In a simple embodiment, a person skilled in the art may figure out that the network device may be in a form shown in FIG. 2. The detection unit 605, the tag addition unit 601, and the sending unit 603 may be implemented using the processor and the memory in FIG. 2. Further, the sending unit 603 may be implemented by executing a first interaction module by the processor, and the detection unit 605 and the tag addition unit 601 may be implemented by executing a first execution module by the processor.

Figure 7:
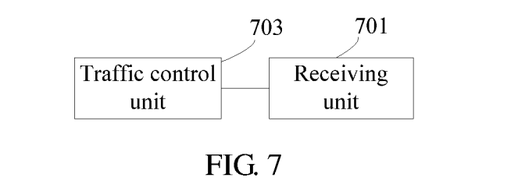
FIG. 7 is a schematic structural diagram of a backbone network switching device according to an embodiment of the present disclosure.

As shown in FIG. 7, an embodiment of the present disclosure provides a schematic structural diagram of a backbone network switching device. A backbone network switching device includes a receiving unit 701 and a traffic control unit 703.

The receiving unit 701 is configured to receive a data flow that is sent by a network device and that carries a traffic control tag. The traffic control tag includes a traffic control tag carried in traffic that is over guaranteed bandwidth or a traffic control tag carried in traffic of guaranteed bandwidth. The traffic control unit 703 is configured to discard, according to the traffic control tag, the traffic that is over the guaranteed bandwidth.

In this embodiment, the backbone network switching device is represented in a form of a functional unit. The "unit" herein may be an ASIC, a circuit, a processor and a memory that execute one or more software or firmware programs, an integrated logic circuit, and/or another device that can provide the foregoing functions. In a simple embodiment, a person skilled in the art may figure out that the backbone network switching device may be in a form shown in FIG. 2. The receiving unit 701 and the traffic control unit 703 may be implemented using the processor and the memory in FIG. 2. Further, the receiving unit 701 may be implemented by executing a second interaction module by the processor, and the traffic control unit 703 may be implemented by executing a second execution module by the processor.

An embodiment of the present disclosure further provides a computer storage medium configured to store a computer software instruction used by the network device shown in FIG. 6 or the backbone network switching device shown in FIG. 7. The computer storage medium includes a program designed for executing the foregoing method embodiments. By executing the stored program, traffic of guaranteed bandwidth of a user can be ensured.

Although the present disclosure is described with reference to the embodiments, in a process of implementing the present disclosure that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

A person skilled in the art should understand that the embodiments of the present disclosure may be provided as a method, an apparatus (device), or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code. The computer program is stored/distributed in a proper medium and is provided as or used as a part of the hardware together with other hardware, or may be distributed in another form, for example, using the Internet or another wired or wireless telecommunications system.

The present disclosure is described with reference to the flowcharts and/or block diagrams of the method, the apparatus (device), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device such that a series of operations and steps are performed on the computer or the other programmable device, thereby generating computer-implemented processing. Therefore, the instructions executed on the computer or the other programmable device provides steps for implementing a specific function in one or more processes in the flowcharts and/or in one or more blocks in the block diagrams.

Although the present disclosure is described with reference to specific features and the embodiments thereof, obviously, various modifications and combinations may be made to them without departing from the spirit and scope of the present disclosure. Correspondingly, the specification and accompanying drawings are merely examples of description of the present disclosure defined by the accompanying claims, and is considered as any of or all modifications, variations, combinations, or equivalents that cover the scope of the present disclosure. Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A traffic control method, comprising:
adding, by a network device in an evolved packet system (EPS) network or a circuit switched (CS) network, a traffic control tag to traffic that is over a guaranteed bandwidth or to traffic of the guaranteed bandwidth;
sending, to a backbone network switch in a backbone network where data flows passing through the EPS or CS network converge, a data flow that carries the traffic control tag;
discarding, by the backbone network switch according to the traffic control tag, the traffic that is over the guaranteed bandwidth when the backbone network is congested;

discarding, by the backbone network switch, the traffic of the guaranteed bandwidth when the backbone network is congested after discarding the traffic that is over the guaranteed bandwidth;

reporting, by the backbone network switch, an event of discarding the traffic of the guaranteed bandwidth of a user to a policy center;

receiving, by the network device via a software defined networking (SDN) controller, a policy of removing a bearer corresponding to the guaranteed bandwidth of the user; and removing, by the network device, the bearer corresponding to the guaranteed bandwidth of the user, wherein the network device comprises a gateway or an evolved NodeB (eNB), and wherein the EPS or CS network comprises an SDN-based architecture.

2. The method according to claim 1, wherein before adding the traffic control tag to the traffic that is over the guaranteed bandwidth or to the traffic of the guaranteed bandwidth, the method further comprises detecting, by the network device, the traffic of the guaranteed bandwidth and the traffic that is over the guaranteed bandwidth in the received data flow, wherein the traffic of the guaranteed bandwidth comprises traffic within a guaranteed bit rate (GBR), and wherein the traffic that is over the guaranteed bandwidth comprises traffic between the GBR and a maximum bit rate (MBR).

3. The method according to claim 1, wherein adding the traffic control tag to the traffic that is over the guaranteed bandwidth comprises:

classifying the traffic that is over the guaranteed bandwidth into at least a first class of traffic and a second class of traffic; and separately adding at least a first and second traffic control tag to the at least first and second classes of traffic, wherein discarding the traffic that is over the guaranteed bandwidth comprises discarding by class, by the backbone network switch according to the first and second traffic control tags and a backbone network congestion degree, the traffic that is over the guaranteed bandwidth such that the first class of traffic is discarded when a first congestion threshold is exceeded and the second class of traffic is discarded when a second congestion threshold is exceeded, and wherein the second congestion threshold is different than the first congestion threshold.

4. The method according to claim 1, further comprising reporting, by the backbone network switch to the policy center, another event of discarding the traffic that is over the guaranteed bandwidth and a backbone network congestion degree representing a bandwidth usage of the backbone network, and wherein the other event of discarding the traffic that is over the guaranteed bandwidth carries an identifier of the data flow of the discarded traffic that is over the guaranteed bandwidth.

5. The method according to claim 4, further comprising:

receiving, by the network device, an adjustment policy of reducing bandwidth of a second user from the policy center, wherein the second user is a source of the discarded traffic that is over the guaranteed bandwidth; and sending, by the network device, the adjustment policy to the second user such that the second user sends a subsequent data flow at a reduced bit rate that is within the guaranteed bandwidth.

6. The method according to claim 1, further comprising:

determining, by the backbone network switch, whether the backbone network is congested after discarding the traffic that is over the guaranteed bandwidth; and transmitting, by the backbone network switch according to the traffic control tag, the traffic of the guaranteed bandwidth if the backbone network is not congested after the traffic that is over the guaranteed bandwidth is discarded.

7. The method according to claim 6, wherein the event of discarding the traffic of the guaranteed bandwidth of the user carries an identifier of the data flow of the discarded traffic of the guaranteed bandwidth.

8. The method according to claim 2, wherein before detecting the traffic of the guaranteed bandwidth and the traffic that is over the guaranteed bandwidth, the method further comprises receiving, by the network device, a message from the policy center, wherein the message is received only when the policy center receives a report from the backbone network switch indicating that the backbone network is congested, and wherein the message instructs the network device to detect the traffic of the guaranteed bandwidth and the traffic that is over the guaranteed bandwidth in the received data flow.

9. A traffic control method, comprising:

receiving, by a backbone network switch in a backbone network where data flows passing through one or more network devices converge, a data flow from a network device in an evolved packet system (EPS) network or a circuit switched (CS) network, wherein the data flow carries a traffic control tag, wherein the traffic control tag comprises a traffic control tag carried in traffic that is over a guaranteed bandwidth or a traffic control tag carried in traffic of the guaranteed bandwidth, wherein the network device comprises a gateway or an evolved NodeB (eNB), and wherein the EPS or CS network comprises a software defined networking (SDN)-based architecture;

discarding, by the backbone network switch according to the traffic control tag, the traffic that is over the guaranteed bandwidth when the backbone network is congested;

discarding, by the backbone network switch according to the traffic control tag, the traffic of the guaranteed bandwidth when the backbone network is congested after discarding the traffic that is over the guaranteed bandwidth; and reporting, by the backbone network switch to a policy center, an event of discarding the traffic of the guaranteed bandwidth of a user, wherein reporting the event is configured to cause the policy center to send, to the network device via an SDN controller, a policy instructing the network device to remove a bearer corresponding to the guaranteed bandwidth of the user.

10. The method according to claim 9, wherein the traffic control tag carried in the traffic that is over the guaranteed bandwidth comprises at least two traffic control tags corresponding to two classes of traffic, and wherein discarding the traffic that is over the guaranteed bandwidth comprises:

discarding, by the backbone network switch according to one of the at least two traffic control tags and a first backbone network congestion threshold, one of the two classes of traffic that is over the guaranteed bandwidth and the first backbone network congestion threshold; and discarding, by the backbone network switch according to another one of the at least two traffic control tags and a second backbone network congestion threshold, another one of the two classes of traffic that is over the guaranteed bandwidth and the second backbone network congestion threshold, wherein the second backbone network congestion threshold is different than the first backbone network congestion threshold.

11. The method according to claim 9, further comprising reporting, by the backbone network switch to the policy center, another event of discarding the traffic that is over the guaranteed bandwidth and a backbone network congestion degree, wherein the other event of discarding the traffic that is over the guaranteed bandwidth carries an identifier of the data flow of the discarded traffic that is over the guaranteed bandwidth, and wherein the backbone network switch reports the other event to the policy center via the SDN controller.

12. A network device for implementing traffic control in an evolved packet system (EPS) network, comprising:
a non-transitory computer readable medium having a plurality of computer readable instructions stored thereon; and
a first processor coupled to the non-transitory computer readable medium, wherein the plurality of computer readable instructions cause the first processor to be configured to:
add a traffic control tag to traffic that is over a guaranteed bandwidth or to traffic of the guaranteed bandwidth;
send, to a backbone network switch in a backbone network where data flows passing through the EPS network converge, a data flow that carries the traffic control tag;
receive, from a policy center via a software defined networking (SDN) controller, a policy of removing a bearer corresponding to the guaranteed bandwidth of a user; and
remove the bearer corresponding to the guaranteed bandwidth of the user, wherein the network device comprises a gateway or an evolved NodeB (eNB), and wherein the EPS network comprises an SDN-based architecture.

13. The network device according to claim 12, wherein the plurality of computer readable instructions further cause the first processor to be configured to detect the traffic of the guaranteed bandwidth and the traffic that is over the guaranteed bandwidth in the received data flow, wherein the traffic of the guaranteed bandwidth comprises traffic within a guaranteed bit rate (GBR), and wherein the traffic that is over the guaranteed bandwidth comprises traffic between the GBR and a maximum bit rate (MBR).

14. The network device according to claim 12, wherein the plurality of computer readable instructions further cause the first processor to be configured to:
classify the traffic that is over the guaranteed bandwidth into at least two classes of traffic; and
separately add at least two traffic control tags corresponding to the at least two classes of traffic.

15. The network device according to claim 12, wherein the plurality of computer readable instructions further cause the first processor to be configured to:
receive an adjustment policy of reducing bandwidth of a second user from the policy center, wherein the second user is a source of discarded traffic that is over the guaranteed bandwidth; and
send the adjustment policy to the second user such that the second user sends a subsequent data flow at a reduced bit rate that is within the guaranteed bandwidth.

16. The network device according to claim 12, wherein the plurality of computer readable instructions further cause the first processor to be configured to receive a message from the policy center via the SDN controller, wherein the message instructs the network device to detect the traffic of the guaranteed bandwidth and the traffic that is over the guaranteed bandwidth in the data flow.

17. A backbone network switch for implementing traffic control in a backbone network where data flows passing through one or more network devices converge, comprising:
a non-transitory computer readable medium having a plurality of computer readable instructions stored thereon; and
a first processor coupled to the non-transitory computer readable medium, wherein the plurality of computer readable instructions cause the first processor to be configured to:
receive a data flow from a network device in an evolved packet system (EPS) network or a circuit switched (CS) network, wherein the data flow carries a traffic control tag, wherein the traffic control tag comprises a traffic control tag carried in traffic that is over a guaranteed bandwidth or a traffic control tag carried in traffic of the guaranteed bandwidth, wherein the network device comprises a gateway or an evolved NodeB (eNB), and wherein the EPS or CS network comprises a software defined networking (SDN)-based architecture;
discard, according to the traffic control tag, the traffic that is over the guaranteed bandwidth when the backbone network is congested;
discard, according to the traffic control tag, the traffic of the guaranteed bandwidth when the backbone network is congested after discarding the traffic that is over the guaranteed bandwidth; and
report, to a policy center, an event of discarding the traffic of the guaranteed bandwidth of a user, wherein reporting the event is configured to cause the policy center to send, to the network device via an SDN controller, a policy instructing the network device to remove a bearer corresponding to the guaranteed bandwidth of the user.

18. The backbone network switch according to claim 17, wherein the traffic control tag carried in the traffic that is over the guaranteed bandwidth comprises at least two traffic control tags corresponding to two classes of traffic, wherein the plurality of computer readable instructions further cause the first processor to be configured to discard by class, according to the traffic control tag and a backbone network congestion degree, the traffic that is over the guaranteed bandwidth such that one of the two classes of traffic is discarded when a first congestion threshold is exceeded and another one of the two classes of traffic is discarded when a second congestion threshold is exceeded, and wherein the second congestion threshold is different than the first congestion threshold.

19. The backbone network switch according to claim 17, wherein the plurality of computer readable instructions further cause the first processor to be configured to report, to the policy center via the SDN controller, another event of discarding the traffic that is over the guaranteed bandwidth and a backbone network congestion degree, wherein the other event of discarding the traffic that is over the guaranteed bandwidth carries an identifier of the data flow of the discarded traffic that is over the guaranteed bandwidth, and wherein the identifier enables the policy center to adjust bandwidth at a source end of the discarded traffic to reduce congestion in the backbone network.

\* \* \* \* \*